3,405,286
ELECTRIC WAVE GENERATOR WITH TWO-STATE
AND INTEGRATOR CIRCUITS
Ronald Mudie, Crowborough, England, assignor to
Servomex Controls Limited
Filed Aug. 17, 1965, Ser. No. 480,374
Claims priority, application Great Britain, Aug. 31, 1964,
35,620/64
8 Claims. (Cl. 307—261)

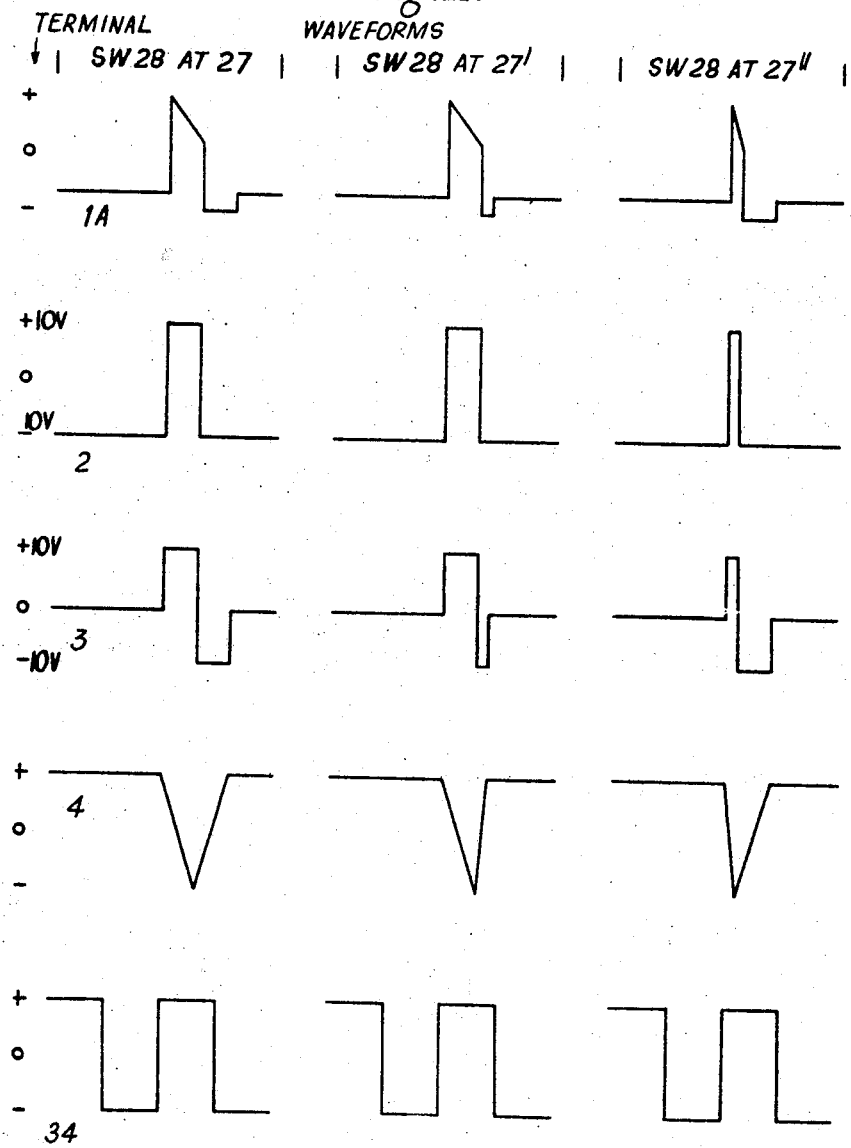

ABSTRACT OF THE DISCLOSURE

With known waveform generators of the trigger-plus-integrator type, difficulty has been experienced due to very small flat-tops of triangular and sawtooth output waveforms and corresponding triggering delay by the feedback path from integrator output to trigger input. To overcome this difficulty, the present invention provides a circuit in which the trigger feeds the inegrator through an intermediate amplifier. A second feedback path is provided from integrator output to intermediate amplifier input and a third feedback path is provided from intermediate amplifier output to trigger input. Additionally, the intermediate amplifier square wave levels are set by oppositely-sensed diodes and the trigger is a bi-stable multivibrator circuit.

---

This invention relates to electric wave generators of the type for generating square waves, triangular, saw-tooth and like waves, according to choice.

It is known to provide such an electric wave generator in which square waves are generated by a bistable trigger circuit, for example a Schmitt trigger, and in which triangular waves are generated by feeding the square waves into an integrating circuit, for example a Miller integrator, by which integrator the rising front of the triangular wave is developed during one horizontal portion of the input square wave, that is during one of the states of the bistable trigger. At a predetermined amplitude of the integrator output, a pulse is developed by the integrator to reset the trigger to its other state, whereupon the falling side of the triangular wave is developed in the integrator output. Such an electric wave generator is described in British Patent No. 814,540, which is also identified by its corresponding U.S. Patent No. 2,879,392.

In such circuit arrangements it is common practice to set the trigger output wave amplitudes, in its two states, by a pair of oppositely-sensed diodes connected to appropriate bias potentials. Similarly, the integrator output wave amplitudes may be set by a further pair of oppositely-sensed, biased diodes.

With such an arrangement, there is a momentary delay after one set amplitude of the integrator output wave is reached, before the pulse is developed to reset the trigger for commencement of the next side of the triangular output wave. This momentary delay appears in the output wave as a flat wave portion at the set output level.

Consequently, the triangular waveform does not show a sharp peak but is slightly truncated. In a practical generator, the effect is very slight indeed, but it is nevertheless present and undesirable.

Moreover if the integrator amplifier is in its saturated state at the time the trigger changes state, the inegrator takes an appreciable time before the output triangular wave starts. This time is normally very short, depending upon the resistance-capacitance value of the circuit, but any such delay is undesirable.

In an electric wave generator of the form described, provided with auxiliary circuits for shaping a triangular wave input to provide a sine-wave output and for providing a second triangular or sine-wave output displaced in phase relatively to the input triangular wave or first output sine-wave, the derived waves necessarily show the corresponding waveform imperfections.

The object of the present invention is to provide an improved electric wave generator having regard to the mentioned disadvantages of the known forms.

Accordingly, the present invention provides an electric wave generator comprising a bistable trigger, for providing a square waveform output, an integrator, having an integrating resistance and an integrating capacitance for providing an output triangular wave from a square wave input and connected for supplying the output wave to the trigger input, the integrator being fed from the trigger by way of an intermediate amplifier, positive feedback being provided from the output of the said intermediate amplifier to the trigger input and the intermediate amplifier being supplied with a potential intermediate the trigger output and the integrator output potentials.

Conveniently, the trigger is a transistor D.C. amplifier with positive gain and positive feedback, the intermediate amplifier is a transistor D.C. amplifier with positive gain, both adapted to have set square wave output levels and the integrator is a D.C. amplifier with negative gain, having its integrating resistance connected in series with its input, followered by a transistor D.C. amplifier providing feedback by way of the integrating capacitance.

The input D.C. amplifier may be a transistor amplifier or it may employ a thermionic valve, preferably a thermionic valve of the electrometer type providing a high input impedance.

In order that the invention may be readily carried into practical effect, one embodiment, by way of example, will now be described in detail with reference to the accompanying drawings, in which.

Figure 1:
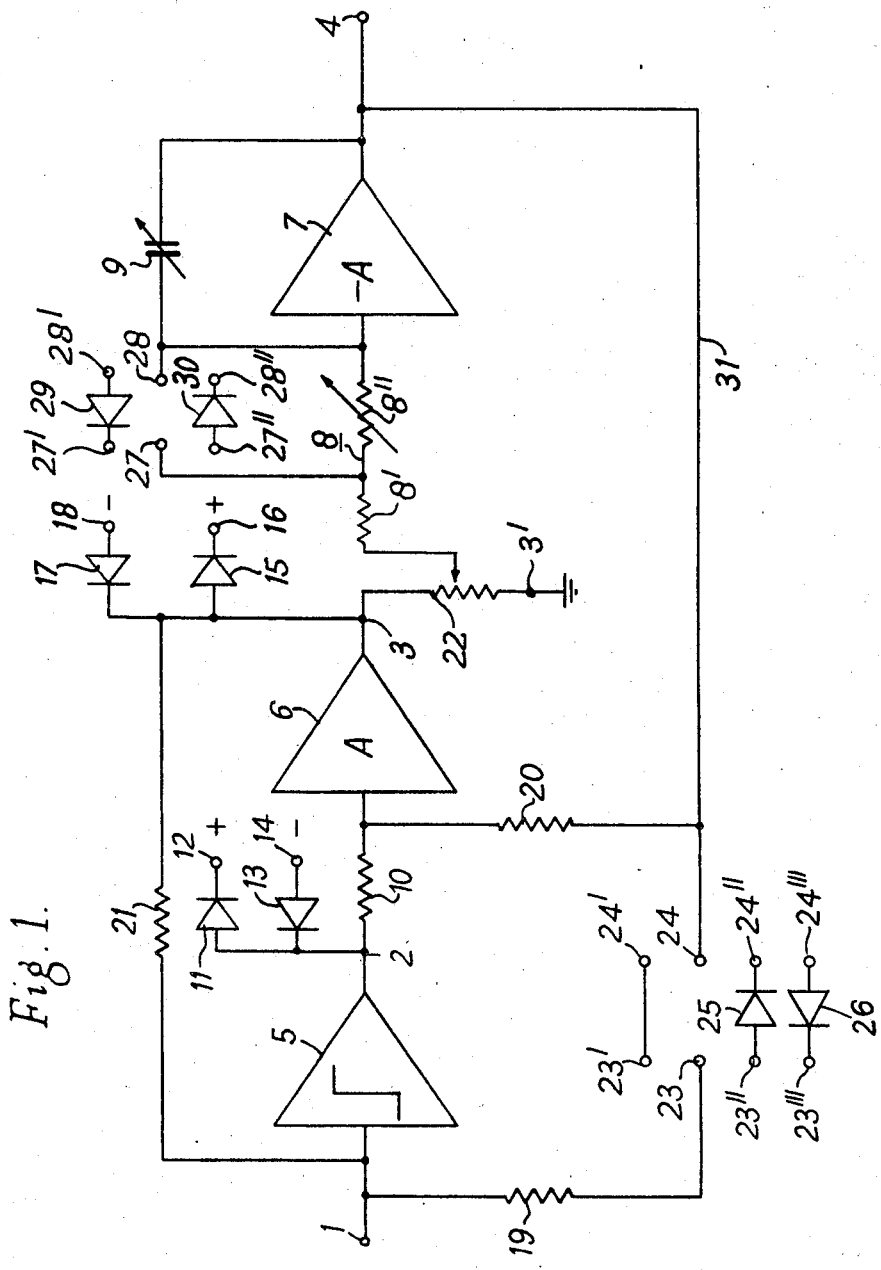
FIG. 1 is a schematic circuit diagram, partially in block form, of an electric wave generator according to the invention.
Figure 2:
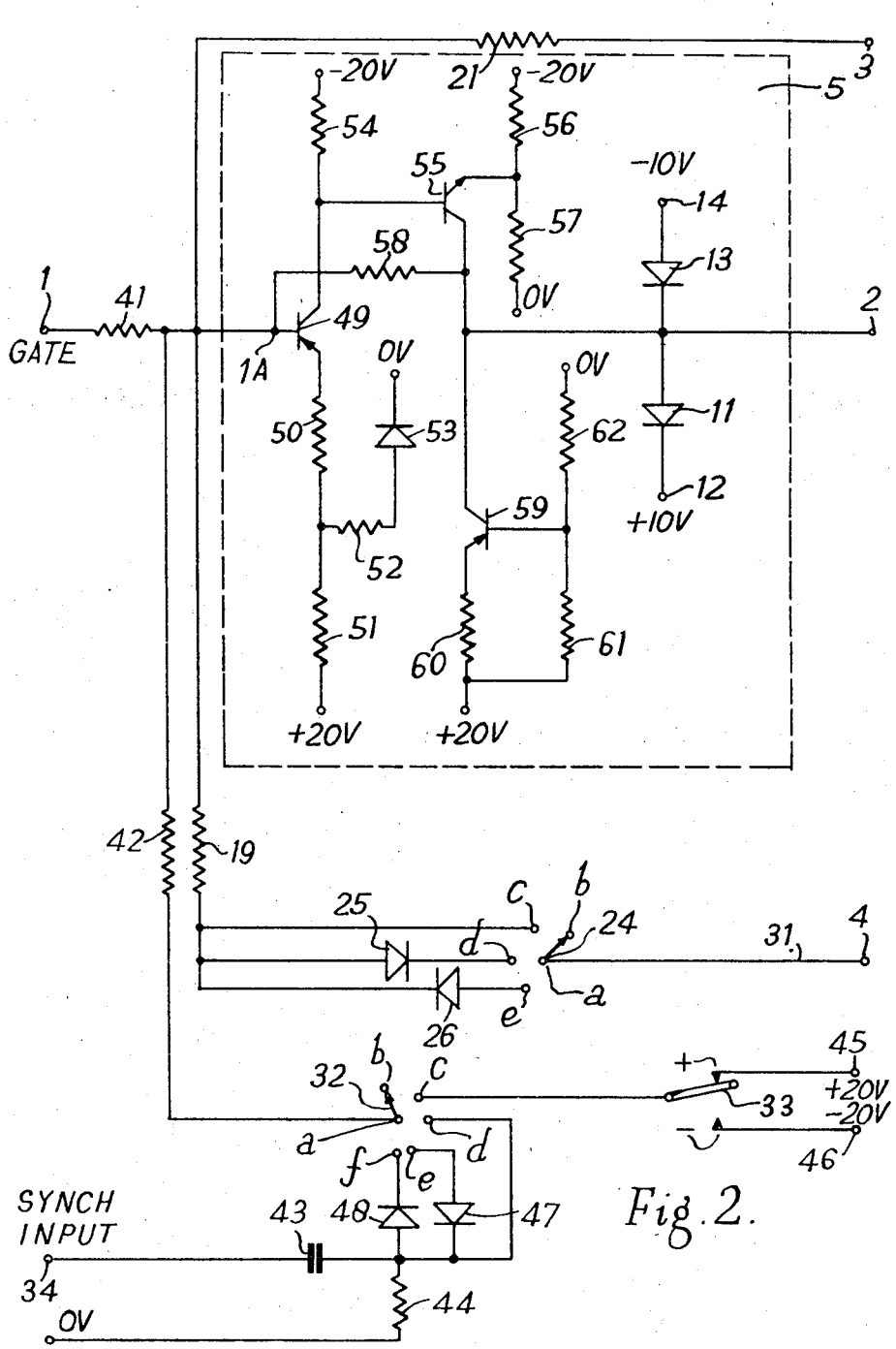
FIG. 2 is a schematic circuit diagram of one form of trigger, shown at 5 in FIG. 1.
Figure 3:
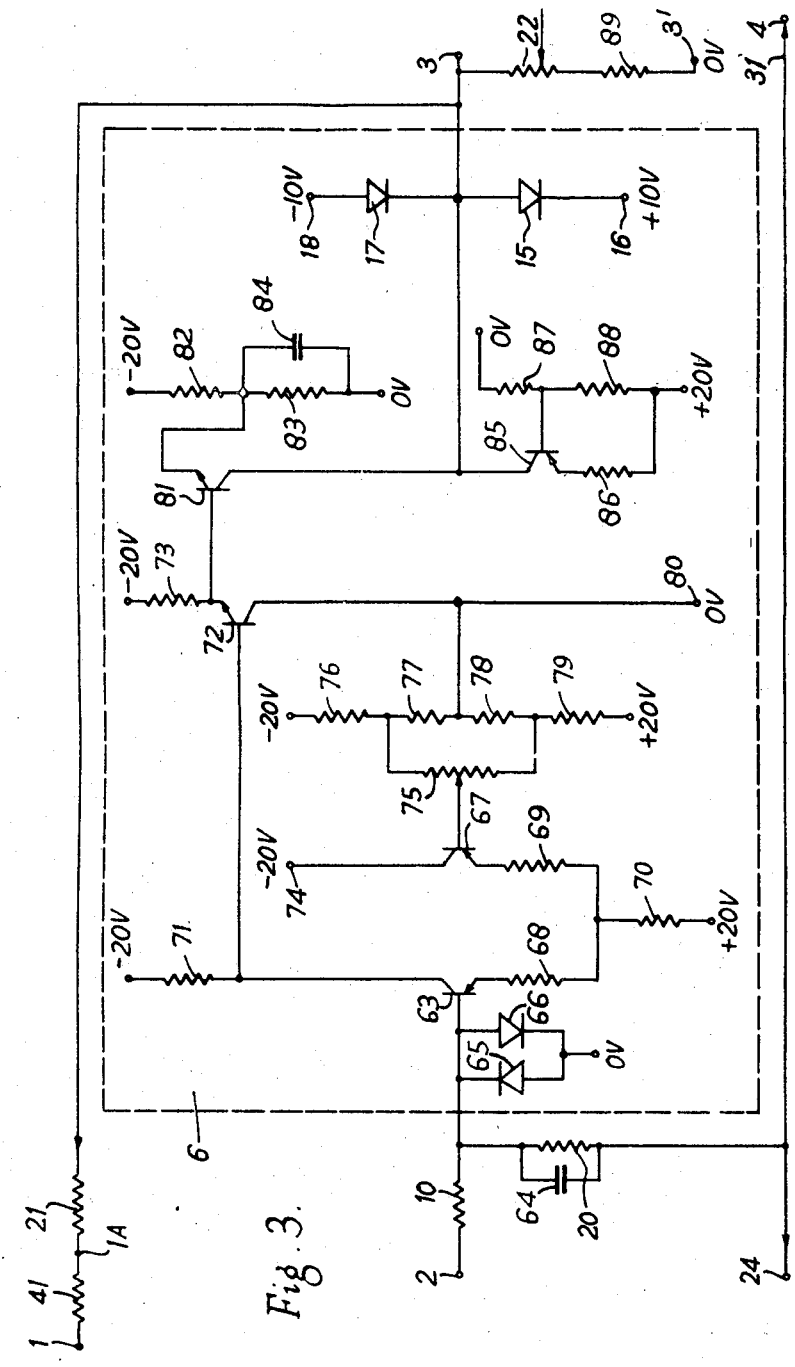
FIG. 3 is a schematic circuit diagram of one form of intermediate amplifier, shown at 6 in FIG. 1.
Figure 4A:
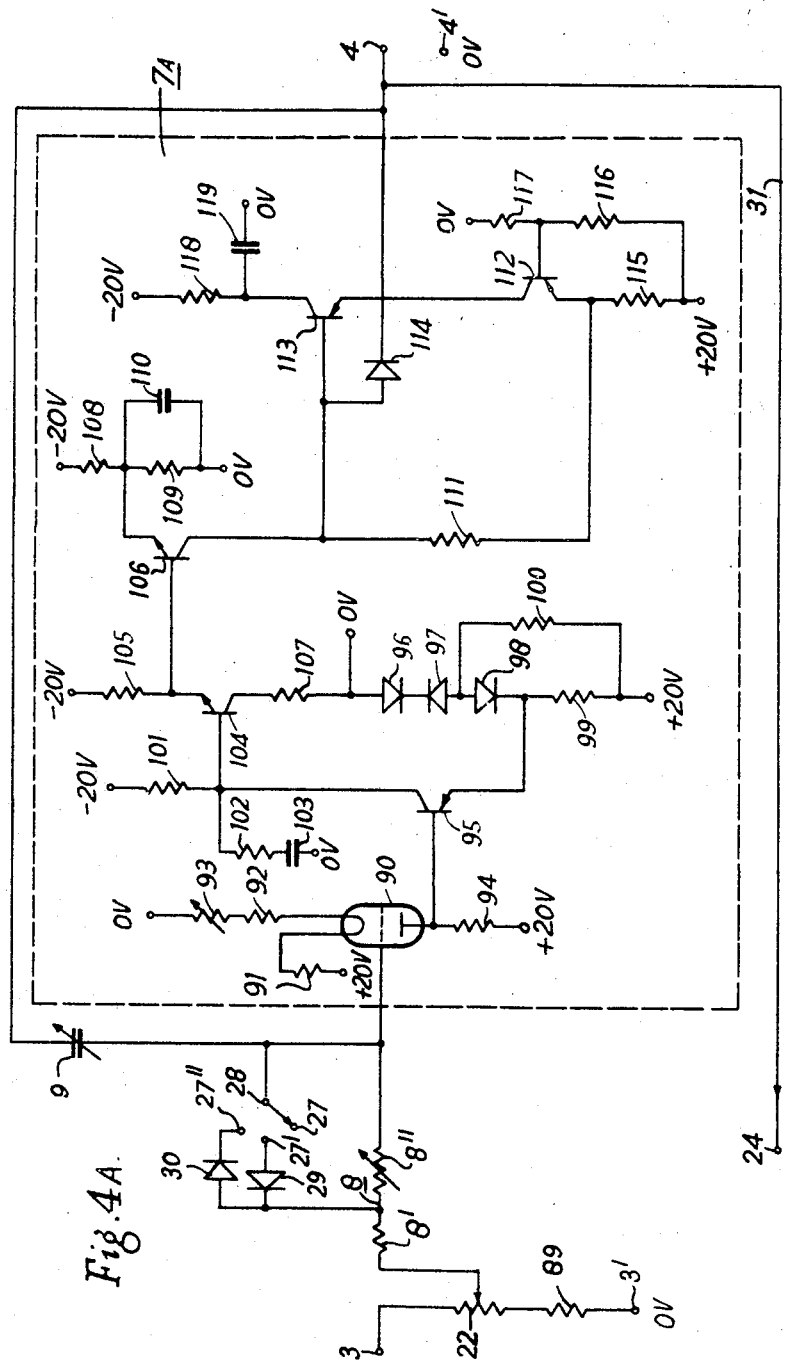
Figure 4B:
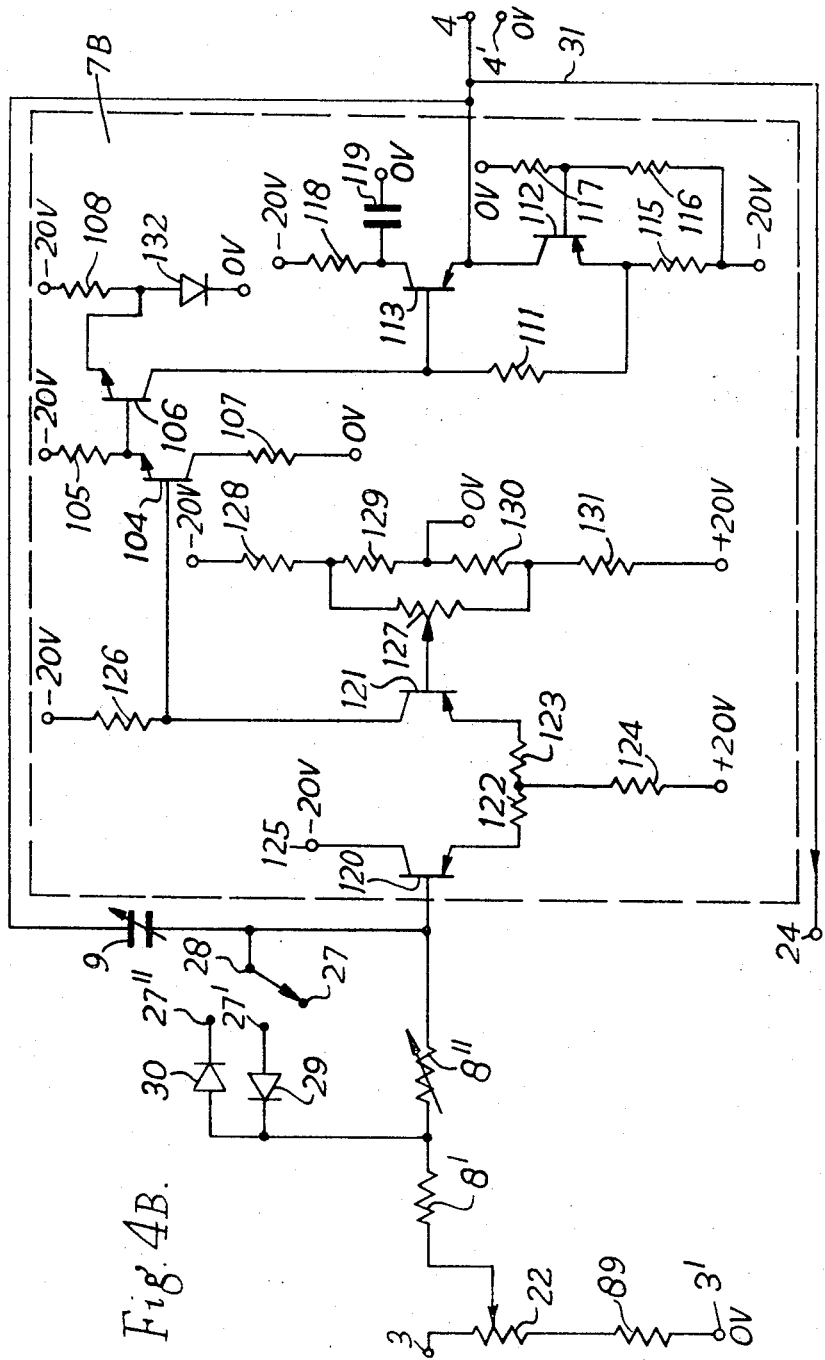
Figure 4C:
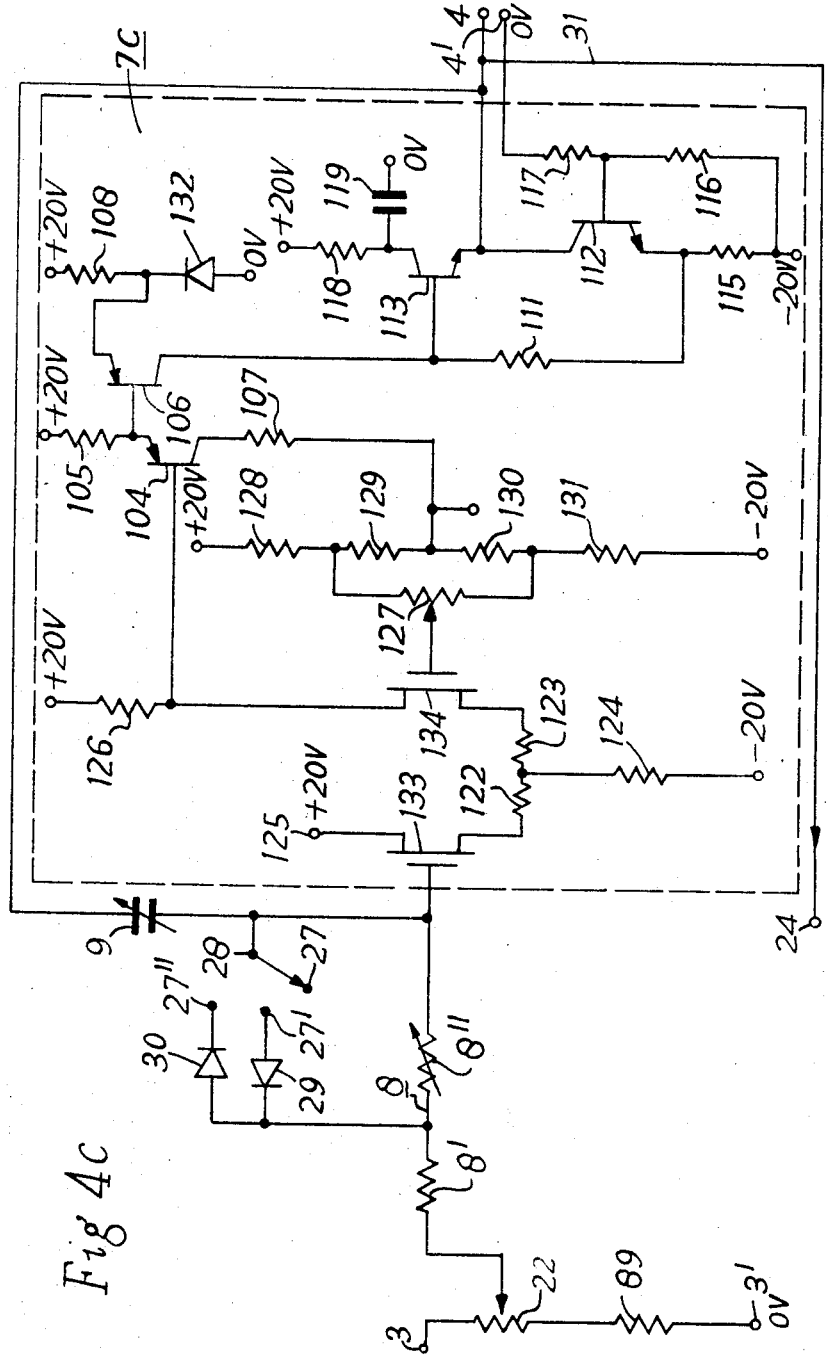
Figure 5:
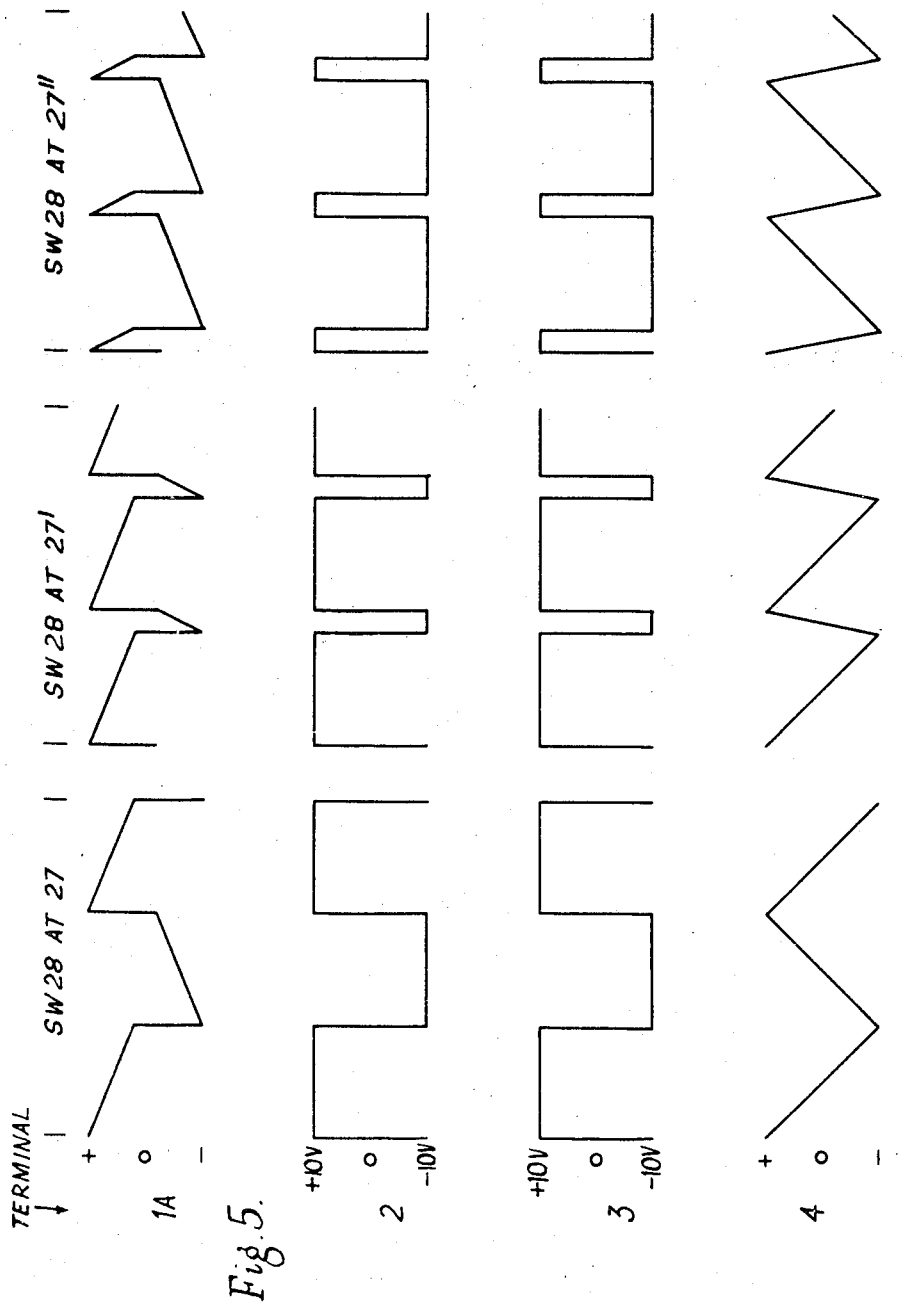
Figure 6:
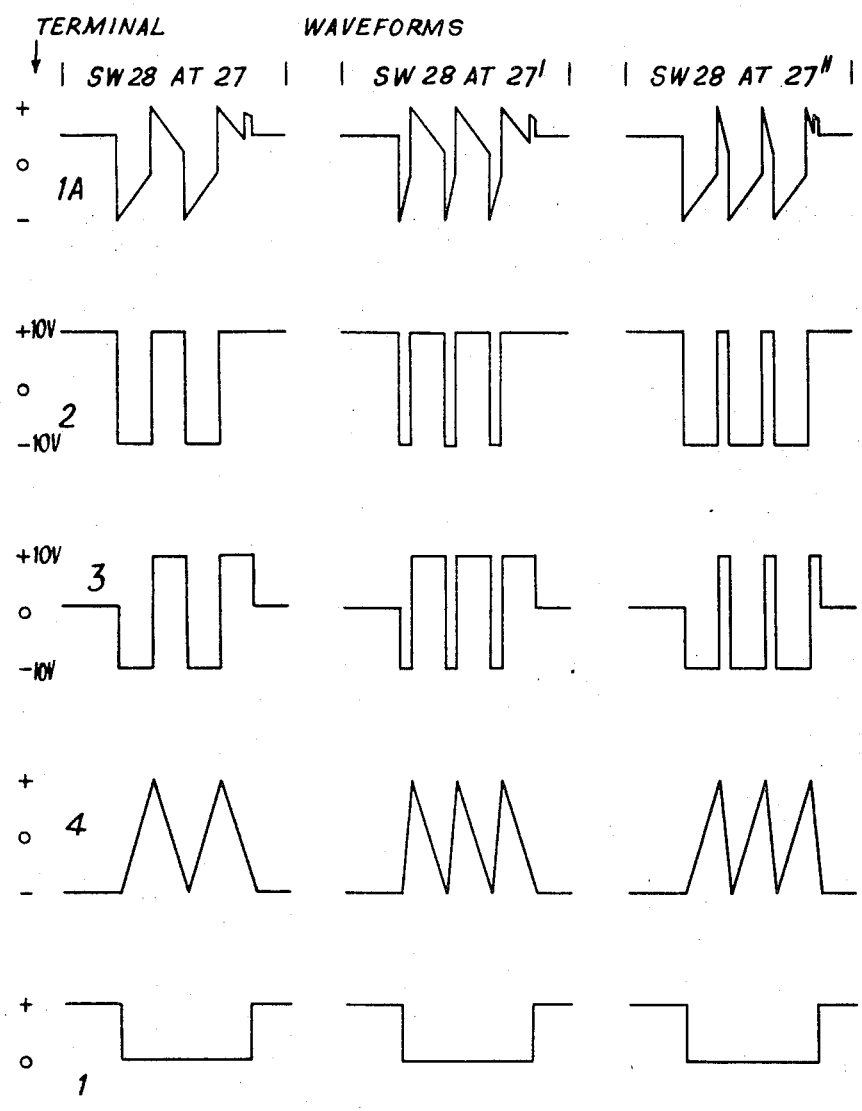
Figure 7:
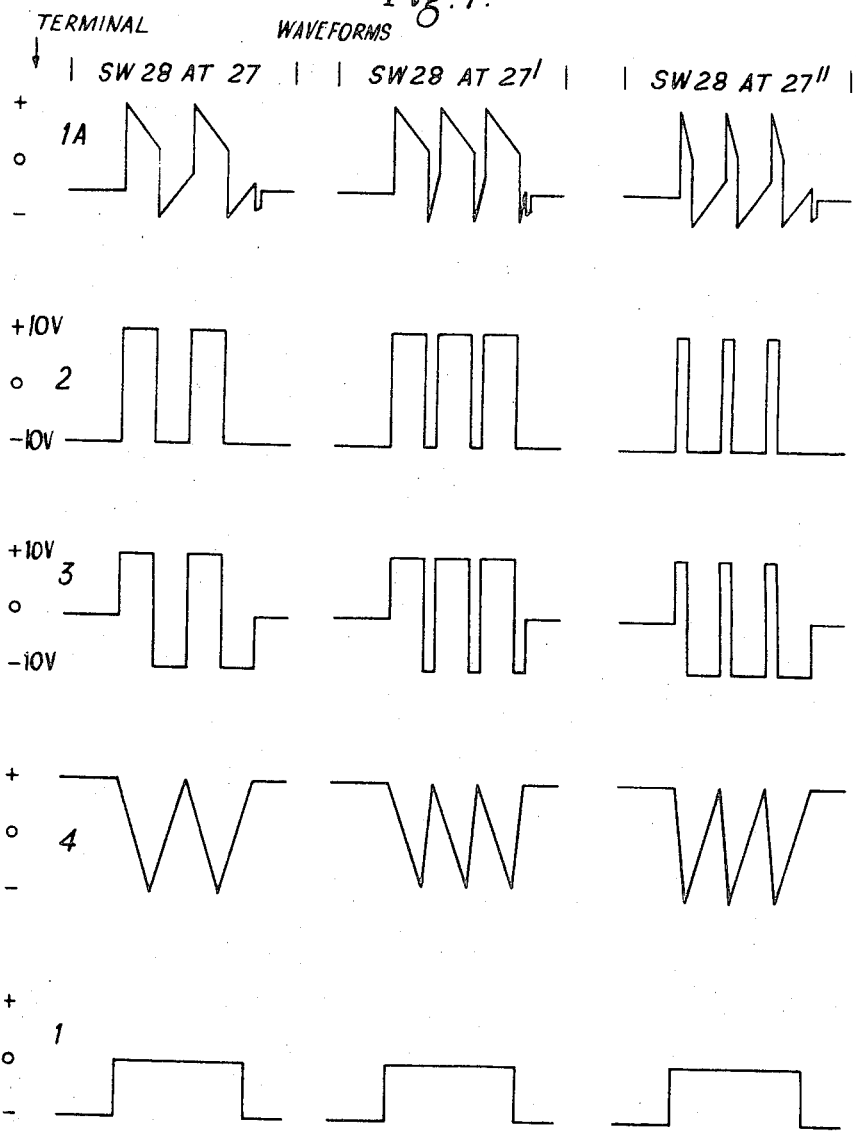
Figure 8:
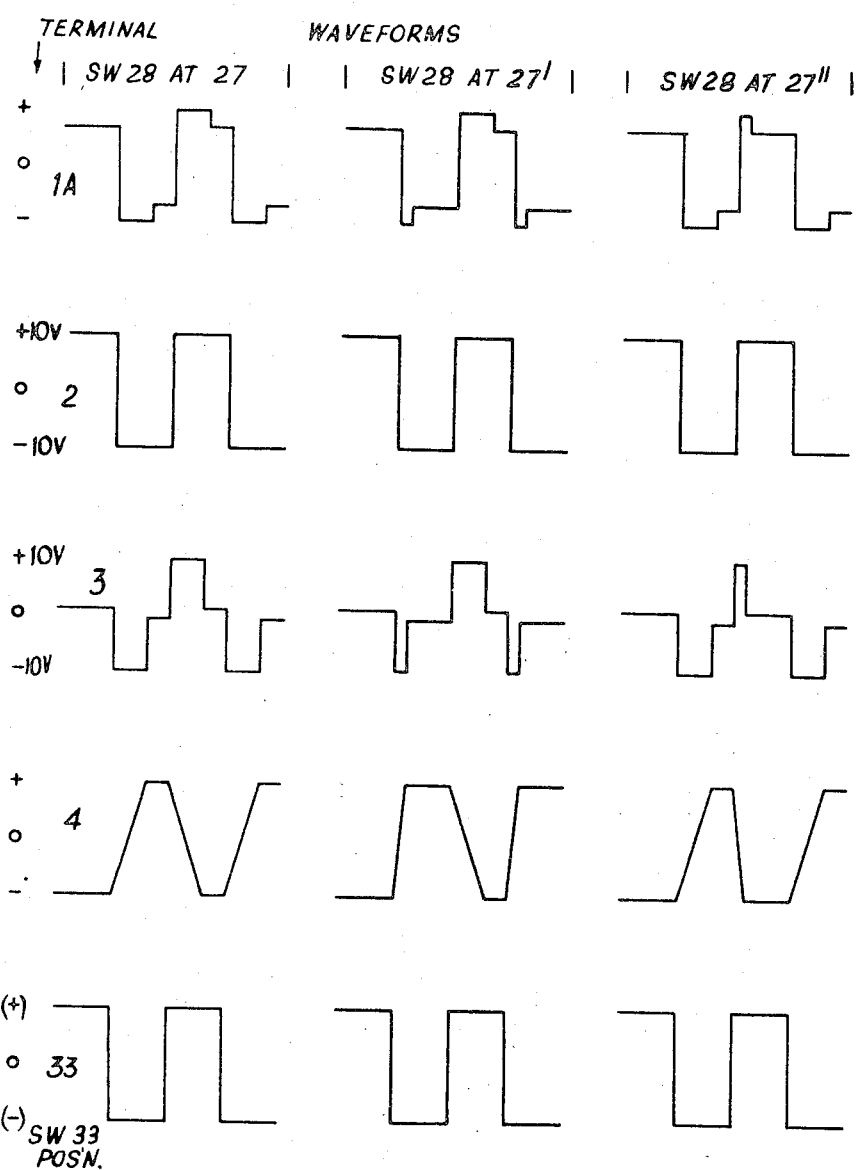
Figure 9:
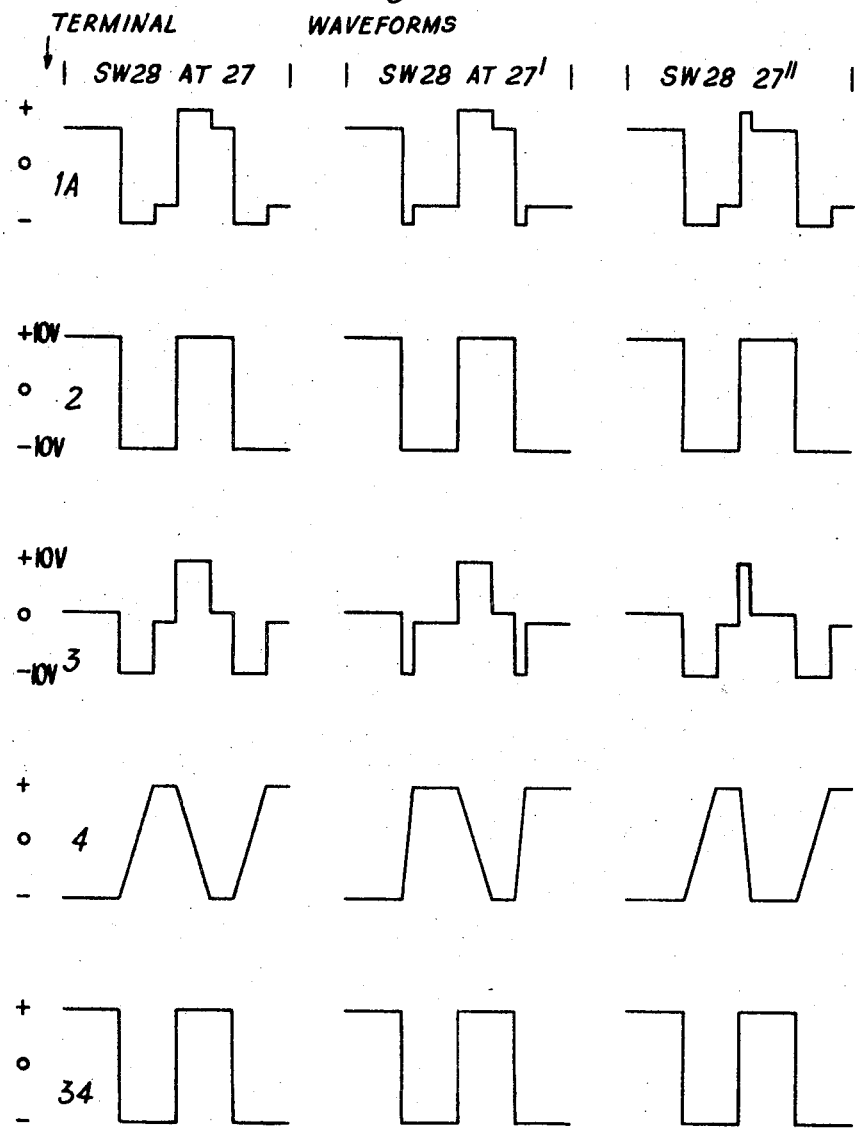
Figure 10:
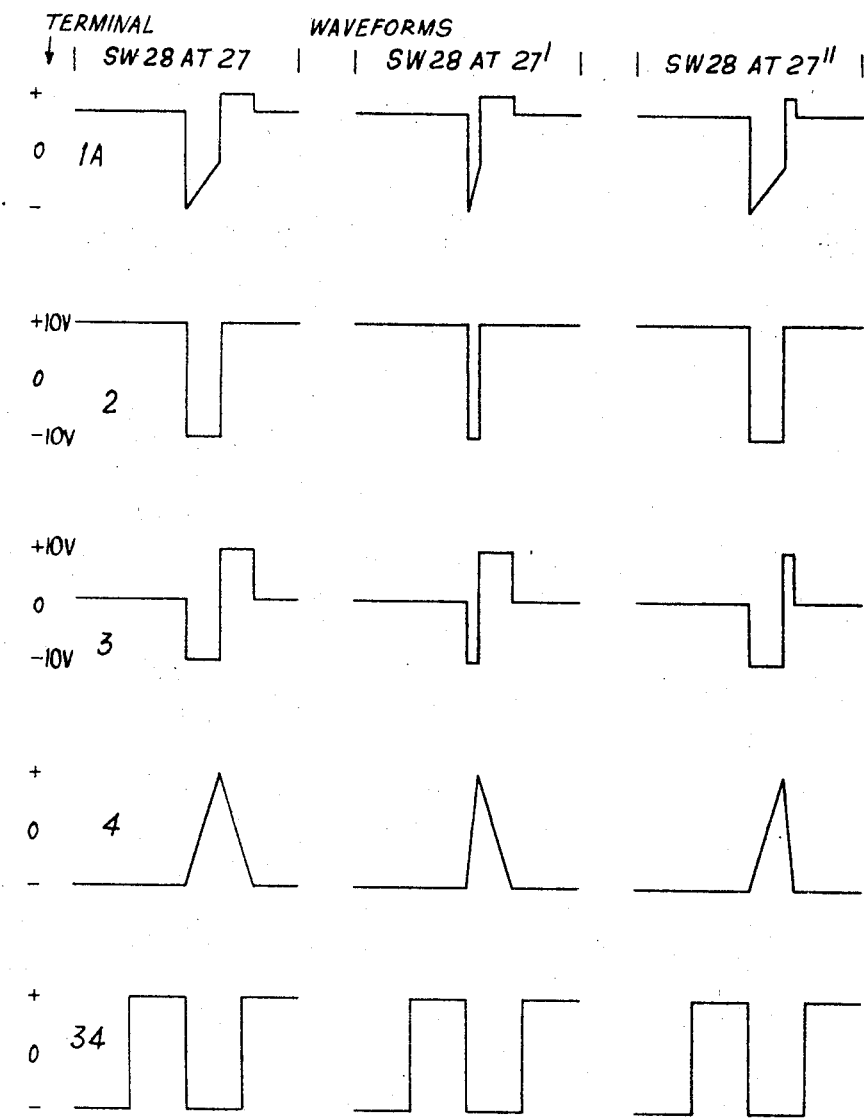

FIGS. 4a, 4b and 4c are schematic circuit diagrams of three alternative integrator amplifiers, corresponding to the amplifier shown at 7 in FIG. 1, and referenced respectively 7a, 7b and 7c in the three figures; and FIGS. 5 to 11 show typical waveforms produced at significant points of the circuit arrangement of FIGS. 2 to 4, for selected modes of operation.

Referring first to FIG. 1, the electric wave generator of this example comprises essentially a trigger 5, feeding a square wave input into an intermediate amplifier 6, which feeds an amplified square wave input into an integrator comprising integrating resistance 8 and integrating capacitance 9.

The integrating resistance 8 comprises a fixed part 8' and a variable part 8".

The integrator supplies its output wave potential to the input of trigger 5, by way of line 31.

The intermediate amplifier 6 provides positive feedback to the input of trigger 5, by way of resistor 21, and is itself fed by a potentiometer formed by resistors 10, 20 between the trigger and integrator output terminals.

Considering the circuit in greater detail, the trigger 5 has an input, or gate, terminal for the supply of control pulses from an external source. The amplitude of the square wave from the trigger 5, in both the positive-going and the negative-going sense, is determined by a pair of oppositely sensed diodes 11 and 13, connected respectively to terminals 12 and 14, to which positive and negative bias potentials are supplied, respectively.

The input of the intermediate amplifier 6 is supplied from the potentiometer comprising resistors 10 and 20 serialy connected between terminal 2 and line 31, the input of amplifier 6 being fed from the junction of the resistors.

The amplitude of the square wave from amplifier 6, in both positive-going and negative-going sense, is determined by a pair of oppositely-sensed diodes 15 and 17 connected respectively to terminals 16 and 18, to which positive and negative bias potentials are supplied, respectively.

The square-wave output at terminal 3 is fed back to the trigger input terminal 1 by way of the resistor 21 and is also developed across a potentiometer 22 connected between terminal 3 and earth, at terminal 3'.

The slider of potentiometer 22 supplies the integrator circuit, being directly connected to the integrator resistor 8, shown as a fixed part 8' and a variable part 8" in the input of amplifier 7. The integrator capacitor 9 is connected between output and input of amplifier 7, in normal manner.

Both integrating resistor 8 and capacitor 9 are made variable, so that the constants of the integrating circuit, and hence the slope of the rising or falling output level, may be varied at will.

Also, the integrating resistor 8" is shunted by the path between terminals 27 and 28, which may be left open circuit, as shown, or completed by one or other of oppositely-sensed diodes 29 and 30 connected respectively between terminals 27', 28' and terminals 27", 28". By inclusion of a diode path, the value of resistor 8" may be selectively reduced, in one sense or the other according to the sense of the diode chosen. This connection varies the slope of the output wave in the one sense compared with the other, for the generation of saw-tooth waves.

The part 8" of the integrating resistance is variable, for the purpose of varying the waveform slope, as mentioned above. The part 8' of the integrating resistance is fixed, to determine the residual value of integrating resistance when one of the diodes 29, 30 is connected in circuit and is conductive.

The output of the integrator appears at terminal 4, from which it is fed back, by way of line 31, to resistor 20 and, by way of resistor 19, to input terminal 1.

Line 31 is shown broken at terminals 23, 24. The terminals 23, 24 may be left open circuited, as shown, or bridged by a conductive link or by one of a pair of oppositely-sensed diodes 25 and 26, connected respectively between terminals 23', 24'; 23", 24" and 23'", 24'". Terminal 23 is connected to terminal 1 by way of the resistor 19. The significance of these alternative connections will be explained in the description of operation which follows.

Assume that terminal 1 has an external positive pulse applied to it, or is otherwise driven to a positive potential. The trigger 5 is moved to one bistable state so that terminal 2 has its limiting positive potential. In the absence of a feedback potential on line 31, amplifier 6 is correspondingly driven positive, so that terminal 3 similarly has its limiting potential, the positive-going transition being enhanced by the positive feedback from terminal 3 to terminal 1 by way of resistor 21. The positive potential at terminal 3 appears across potentiometer 22, so that a predetermined proportion is fed to the integrator input. In consequence, the potential at terminal 4 moves negatively.

Assuming, first, that terminals 23 and 24 are bridged by the link 23', 24', the negative potential at terminal 4 is fed back to terminal 1, by way of line 31 and resistor 19, in opposition to the positive potential feedback from terminal 3.

At the point where the potential at terminal 4 has the value:

$$V_4 = -\frac{R.20}{R.10}V_2$$

that is, minus the ratio of the resistances of resistors 20 and 10, times the potential at terminal 2, the input potential to amplifier 6 falls to zero, and the output potential at terminal 3 likewise falls to zero. Consequently, positive feedback ceases, the whole negative potential of terminal 4 appears at terminal 1 and trigger 5 is set to its other bistable state.

In consequence, terminals 2 and 3 now acquire their limiting negative potentials. With a negative input to the integrator, the potential at terminal 4 now moves positively. When the corresponding positive potential of line 31 is reached, such that the input to amplifier 6 falls to zero, the potential at terminal 3 and the feedback to terminal 1 also fall to zero. Now, the whole positive potential on line 31 is applied to terminal 1 and the trigger 5 is once more reset to the state first described above, when terminals 2 and 3 move positive.

The operation thus continues, with periodic reversals of the state of trigger 5, to provide a square wave at terminal 2 and at terminal 3 and a triangular wave, with terminals 27 and 28 open circuited, at terminal 4.

Assume, next, that terminals 23, 24 are open circuited. The operation will now be as described above, solely in respect of the positive step at terminals 2 and 3 and the negative transition at terminal 4. Since the negative potential on line 31 cannot now be applied to terminal 1, the state of trigger 5 cannot be changed. A single square wave step occurs at terminals 2 and 3 and a single negative-going voltage sweep occurs at terminal 4. Thereafter the potentials remain steady, awaiting application of an external negative pulse to terminal 1.

Such a negative pulse resets trigger 5, so that a single negative step at terminals 2 and 3 and a single positive sweep at terminal 4 results.

Assume, next, that terminals 23, 24 are bridged by diode 26. It will be seen that a positive potential at terminal 4 will be fed to terminal 1, but not a negative potential. Thus, if a negative external pulse is applied to trigger 5, a subsequent positive pulse will be applied from terminal 4. In consequence, one full negative-going square wave will appear at terminals 2 and 3 and one full positive-going triangular wave will appear at terminal 4.

Correspondingly, if terminals 23, 24 are bridged by diode 25, one full positive-going square wave will appear at terminals 2 and 3 and one full negative-going triangular wave will appear at terminal 4.

In either case, the single complete wave may be repeated by application of a further external pulse, of correct polarity, to terminal 1.

With all the modes of operation described above, the slope of the triangular waves, and hence the repetition frequency for continuous running, may be increased by reducing the values of either, or both, the integrating resistance and capacitance or by increasing the potential applied to the integrator by the setting of potentiometer 22.

With the connection between terminals 23, 24, for either continuous running or for one full wave output, a saw-tooth wave may be generated, that is the slope of one excursion increased relatively to the slope of the other excursion, by bridging terminals 27, 28 by one or other of diodes 29 and 30. With diode 29 in use, the slope is increased in the positive-going sense. With diode 30, the slope is increased in the negative-going sense.

Referring back, now, to the mentioned disadvantages of the known electric wave generator circuit arrangements, in which delay in generation of the trigger pulse by the integrator and saturation of the integrator amplifier both result in the presence of flat portions of a supposedly triangular, or saw-tooth, waveform, attention is drawn to certain features of the present circuit arrangement.

Firstly, the operative trigger pulse, for reversing the state of trigger 5, is not produced solely by the integrator but is the resultant of a rising potential, positive or negative, at terminal 4 and a disappearing potential, negative or positive, respectively, at terminal 3. Thus, the delay in production of a trigger pulse, after the integrator output has reached the predetermined critical value, is avoided and the resultant waveform flat portion is similarly avoided.

Also, at the completion of the required integration operation, the input to the amplifier 6 falls to zero, and similarly the input to the integrator falls to zero, so that the operation of integration is arrested. The amplitude of the integration sweep at terminal 4 is thus determined by the potential at terminal 2, which is fixed by diode 11 or 13, according to the sense of the wave, and by the ratio of resistances 10 and 20, line 31 rising only to that potential which makes the input to amplifier 6 just equal to zero. This amplitude is fixed in the design of the circuit to be below the saturation point of amplifier 7 and thus the other souce of flat portions in the output waveform is avoided.

Attenion is now drawn to the purpose of potentiometer 22. Although integrator resistor 8 and capacitor 9 are both made variable, for controlling the rate of integration, hence the slope of the potential sweep at terminal 4 and hence the repetition frequency of the output wave during continuous running, the repetition frequency is not a linear function of the value of resistor 8, but of the reciprocal of this value.

Hence, it is preferred to provide continuously-variable control of the repetition frequency by control of the amplitude of the square wave applied to the integrator. This is achieved by the potentiometer 22, which is a substantially linear law potentiometer and provides a linear change of output wave frequency with the angular setting thereof.

The effect of frequency control by change in values of resistor 8 and capacitor 9 is still used, but is achieved by selective switching of resistances and capacitances of preset values. By this combination, together with the continuously-variable control of potentiometer 22, a very wide range of repetition frequency of the output waves at terminal 4 is achieved, without requiring values of capacitor 9 so small as to be comparable with circuit stray capacitances or so large as to require unduly expensive components.

It will be clearly understood that the trigger 5 and amplifiers 6 and 7 may take a great variety of forms according to choice and still be within the scope of the invention. They may comprise thermionic or solid-state amplifiers and comprise few or many stages, as desired. The feed-back line 31 may include an amplifier, having an even number of stages, but the provision of such an amplifier is not essential.

A preferred practical form of the arrangement of FIG. 1 is shown in FIGS. 2 and 3 and any one of FIGS. 4a, 4b and 4c in which figures the same circuit elements appearing in the different figures are indicated by the same reference numerals throughout and by the same reference numerals as are used for corresponding elements in FIG. 1.

The trigger 5, amplifier 6 and three forms of amplifier 7 are shown in schematic circuit diagram form within the broken-line boxes correspondingly numbered in FIG. 2, FIG. 3 and FIGS. 4a, 4b and 4c, respectively, and correspondingly suffixed 7a, 7b and 7c in FIGS. 4a, 4b and 4c, respectively. It will be noted that the associated pair of diodes for trigger 5 and amplifier 6 are shown within the boxes of FIGS. 2 and 3, for covenience. Interconnection of the circuit parts of FIGS. 2 and 3 and FIGS. 4a, 4b or 4c will be obvious from the provision of terminal points of interconnection identically numbered in the two related figures.

Considering, now, the schematic circuit diagrams in greater detail, FIG. 2 shows the trigger 5 having an input terminal 1A. To input terminal 1A are supplied, in addition to alternative inputs now to be described, feedback from the output of amplifier 6, at terminal 3, by way of resistor 21 and feedback from the output of amplifier 7, at terminal 4, by way of line 31 and resistor 19, as shown in FIG. 1.

In FIG. 2, the alternative paths provided between terminals 23 and 24 of FIG. 1, are provided by a single-pole, 4-way switch 24 having a common terminal $a$ which is connected to one of terminals $b$, $c$, $d$ and $e$. Terminals $b$ and $c$ are respectively open and closed circuit. Terminals $d$ and $e$ close the circuit by way of oppositely sensed diodes 25 and 26, respectively.

Control inputs to trigger 5 are supplied at gate input terminal 1, by way of a resistor 41 and from a single-pole, 5-way switch 32 by way of a resistor 42.

A pair of terminals 45 and 46 are connected respectively to an external voltage source providing +20 v. at terminal 45 and −20 v. at terminal 46. A 2-way switch 33 selects either +20 v. at terminal 45 or −20 v. at terminal 46.

A pulse of sinusoidal input for synchronising the trigger 5 may be supplied to a pair of terminals 34 and 0 v., by way of a series capacitor 43 and a shunt resistor 44.

Switch 32 has a common terminal $a$ which is connected alternatively to one of terminals $b$, $c$, $d$, $e$, and $f$. Terminal $b$ is open circuit, terminal $c$ selects the +20 v. or −20 v. input selected by switch 33. Terminal $d$ connects the synchronising input from terminal 34, directly and terminals $e$ and $f$ connect the synchronising input by way of oppositely-sensed diodes 47 and 48, respectively.

The trigger 5 of FIG. 2 comprises a transistor 49 input D.C. amplifier having inputs by way of resistors 19, 21, 41 and 42, as described.

Transistor 49 has its emitter connected to +20 v. by way of resistors 50, 51 in series. The junction is connected to 0 v. by way of resistor 52 and diode 53. The collector of transistor 49 is connected to −20 v. by way of load resistor 54 and to the base of transistor 55.

Transistor 55 has its collector connected to the collector of a transistor 59, to the junction of diodes 11 and 13, to the output terminal 2 and to the base of transistor 49 by way of a resistor 58. Two resistors 56 and 57 are serially connected between −20 v. and 0 v. The emitter of transistor 55 is connected to the junction of the resistors 56 and 57.

Transistor 59 has its emitter connected to +20 v. by way of a resistor 60. Two resistors 61 and 62 are serially connected between +20 v. and 0 v. The base of transistor 59 is connected to the junction of the resistors 61 and 62.

The trigger 5 of FIG. 2 thus comprises a simple transistor D.C. amplifier providing positive gain of about 50 times and having positive feedback from the collector of transistor 55 to the input of transistor 49 by way of resistor 58.

In operation, the trigger 5 of FIG. 2 requires a reversal of input polarity at terminal 1A to effect a reversal of output potential at terminal 2. This feature is not an essential feature of the trigger 5, but is preferred, since the change over time with the output potential is reduced thereby.

The input circuit of transistor 49 is not especially stable in its operating point, but this is not of practical consequence, because the instant of triggering is determined by the collapse of the potential at terminal 3 of amplifier 6.

The output of trigger 5 is held at its alternative potential values; +10 v. and −10 v., by diodes 11 and 13. This is a very desirable feature, since it reduces the rise time, that is the changeover time, of the square wave output. Also, the square wave amplitude determines the triangular wave output amplitude of the integrator 7 and thus affects the frequency stability of the generator as a whole.

FIG. 3 shows the pre-amplifier 6 of FIG. 1 with an input terminal provided by the base of a transistor 63. Terminal 2 and input resistor 10 of FIG. 1 are shown. The series resistor 20 from feed back line 20 is shown shunted by a capacitor 64.

Transistor 63 has its input base terminal connected to 0 v. by way of oppositely-sensed diodes 65 and 66. Transistor 63 and a transistor 67 have their emitters connected by way of resistors 68 and 69, respectively, and a common resistor 70 to +20 v. The collector of transistor 63 is connected to −20 v. by way of a resistor 71 and to the base of a transistor 72. The emitter of transistor 72 is connected to −20 v. by way of a resistor 73.

Transistor 67 has its collector connected directly to −20 v. at 74. The base of transistor 67 is connected to the slider of a potentiometer 75. Four resistors 76, 77, 78 and 79 are serially connected between −20 v. and +20 v. The ends of potentiometer 75 are connected respectively to the junctions of resistors 76, 77 and to the junction of resistors 78, 79. The junction of resistors 77, 78 and the collector of transistor 72 are connected to 0 v. at 80.

The emitter of transistor 72 is connected to the base of a transistor 81. Two resistors 82, 83 are serially connected from −20 v. to 0 v. Resistor 83 is shunted by a capacitor 84. The emitter of transistor 81 is connected to the junction of resistors 82, 83.

The collector of transistor 81 is connected to the collector of a transistor 85, to the diodes 15 and 17 and to the output terminal 3. The emitter of transistor 85 is connected to +20 v. by way of a resistor 86. Two resistors 87, 88 are serially connected from 0 v. to +20 v. The base of transistor 85 is connected to the junction of resistors 87, 88.

Output terminal 3 is connected to input terminal 1A of trigger 5 of FIG. 2 by way of resistor 21. Terminal 3 is also connected to 0 v. at terminal 3′ by way of a potentiometer 22 and a resistor 89, serially connected together.

The pre-amplifier 6 of FIG. 3 is a transistor D.C. amplifier with a positive gain of about 100 times. The input comprises transistors 63 and 67 connected as a long-tailed pair to reduce drift to the minimum. It should be noted that drift of the input zero would result in drift of the output voltage from integrator 7. The slider of potentiometer 75 is set to a potential slightly above or below 0 v., and the base of transistor 67 correspondingly, to ensure equality of the positive and the negative excursions of the triangular wave output of the integrator 7.

The output potential of pre-amplifier 6 at terminal 3 is limited to +10 v. or −10 v. by diodes 15 and 17. Control of the otuput voltage amplitude is necessary as the amplitude controls the capacitor charge rate of the integrator 7. Hence, stability of the output voltage preserves the frequency stability of the generator.

The shunt capacitors 64 and 84 are included to improve frequency response. The pair of diodes 65 and 66 are included in the input circuit of transistor 63 to prevent excessive overloading of the transistor.

FIG. 4a shows, within the broken line box referenced 7a, one form of the integrator 7 of FIG. 1 using a thermionic valve 90 of the electrometer type as input amplifier. The integrator resistor 8, and integrating capacitor 9 are as shown in FIG. 1. The input impedance 22, 89 are as shown in FIG. 3.

The alternative circuit connections shown between the terminals 27 and 28 of FIG. 1 are selected, in the circuit of FIG. 4a, by a 3-way switch 28, the common terminal of which is connected to any one of terminals 27, 27′ and 27″. Terminal 27 is open circuit. Terminals 27′ and 27″ are connected respectively to oppositely-sensed diodes 29 and 30.

The input terminal of the integrator amplifier is the grid of valve 90. The valve filament is connected in series with resistors 91, 92 and 93 between +20 v. and 0 v. The valve anode is connected by way of load resistor 94 to +20 v. and directly to the base of a transistor 95.

Three diodes 96, 97 and 98 and a resistor 99 are serially connected from 0 v. to +20 v. Diodes 96 and 98 are sensed to oppose current flow; diode 97 is sensed oppositely from diodes 96, 98. Diode 98 and resistor 99 are shunted by a resistor 100. The emitter of transistor 95 is connected to the junction of diode 98 and resistor 99. Transistor 95 has its collector connected to −20 v. by way of a resistor 101, to 0 v. by way of a resistor 102 and a capacitor 103 and directly to the base of a transistor 104.

Transistor 104 has its emitter connected to −20 v. by way of a resistor 105 and directly to the base of a transistor 106. The collector of transistor 104 is connected to 0 v. by way of a resistor 107.

Transistor 106 has its emitter connected to the junction of two resistors 108, 109 serially connected between −20 v. and 0 v. Resistor 109 is shunted by a capacitor 110. The collector of transistor 106 is connected through a resistor 111 to the emitter of a transistor 112 and directly to the base of a transistor 113. The emitter-base circuit of transistor 113 is shunted by a diode 114.

Transistor 112 has its emitter connected to +20 v. by way of a resistor 115 and has its base connected to the junction of two resistors 116, 117 serially connected between +20 v. and 0 v.

Transistor 113 has its collector connected to −20 v. by way of a resistor 118 and to 0 v. by way of a capacitor 119. The collector of transistor 112 and the emitter of transistor 113 are connected to the output terminal 4.

The integrator amplifier 7a of FIG. 4a is a D.C. amplifier with a negative gain of about 1,200 times. The use of an input electrometer type valve reduces the input current to $10^{-12}$ amperes or less.

The network of diodes 96, 97 and 98 and resistors 99 and 100 provide the required bias potential to the emitter of transistor 95. This bias potential has a temperature coefficient of the required sign and magnitude to compensate for the inherent temperature coefficient of the base-emitter voltage of transistor 95.

Resistor 102 and capacitors 103, 110 and 119 have the purpose to improve the high frequency response of the integrator amplifier.

Diode 114 is included to protect the base-to-emitter junction of transistor 113 from breakdown. The inclusion or not of diode 114 is determined by the voltage rating of the particular transistor used.

The high input impedance of the integrator amplifier 7a permits of the use of a small value of the variable capacitor 9, in this embodiment 0.5 μf maximum capacitance, and a high value of resistor 8. If a larger value capacitor 9 and smaller valve resistor 8 be used, the input impedance requirement is not so stringent, a point which is relevant to the transistor amplifiers 7b and 7c described below.

Variable resistor 93 determines the grid bias potential of valve 90. It is necessary to set the input potential accurately to 0 v., otherwise the rate of change of the output voltage at terminal 4 differs according to the sense of its change, that is a "triangular" wave becomes a sawtooth wave, instead. By reason of the feedback by line 31 to the trigger 5, the bias setting also affects the mark-space ratio of the square wave output at terminal 2 under continuous operation conditions.

In the input circuit to integrator amplifier 7a, a fixed resistor 89 is included in series with the variable resistor 22 to provide a minimum circuit resistance and hence to limit the ratio of variability of the combined resistance 22, 89. Otherwise, if the combined resistance approached zero, the maximum frequency generated would approach infinity and the input to amplifier 7a approach zero.

FIGS. 4b and 4c show transistor input amplifier embodiments 7b and 7c respectively of the amplifier 7 of FIG. 1.

FIG. 4b shows a normal transistor input amplifier 7b having a relatively low input impedance and suitable for use when the value of integrating resistor 8 is low, and the value of capacitor 9 is high, correspondingly. FIG. 4c shows an amplifier 7c using metal to oxide to semiconductor transistor (M.O.S.T.) devices providing a high input impedance, which is more closely the transistor equivalent of the electrometer valve amplifier 7a of FIG. 4a.

In FIGS. 4a, 4b and 4c, corresponding elements are indicated by the same reference numerals throughout the three figures.

Comparing FIG. 4b with FIG. 4a, it will be noted that integrator amplifier 7b differs from amplifier 7a mainly in respect of the input amplifier. Amplifier 7b has two transistors 120 and 121 arranged as a long-tailed pair with separate emitter resistors 122 and 123 respectively and a common emitter resistor 124 connected to +20 v. The input terminal of the amplifier is to the base of transistor 120, the collector of which transistor is connected directly to −20 v. at terminal 125.

The collector of transistor 121 is connected to −20 v. by way of resistor 126 and directly to the base of transistor 104.

The base of transistor 121 is connected to the slider of a potentiometer 127. Four resistors 128, 129, 130 and 131 are serially connected from −20 v. to +20 v. The junction of resistors 129, 130 is connected to 0 v. The ends of potentiometer 127 are connected to the junctions of resistors 128, 129 and the junction of resistors 130, 131, respectively. The resistance network 127 to 131 of FIG. 4b replaces the diode-resistor network 91 to 93 of FIG. 4a and sets the base potential of transistor 121 in exactly similar manner as the resistor network 75 to 79 described with reference to FIG. 3.

In the following part of the amplifier circuit, the resistor-capacitor combination 109, 110, of FIG. 4a is replaced by a diode 132 in FIG. 4b. Diode 132 provides a low-impedance bias point for the emitter of transistor 106. The optional diode 114 of FIG. 4a is not shown in FIG. 4b.

Amplifier 7c of FIG. 4c differs from amplifier 7b of FIG. 4b solely in the use in the input circuit of two M.O.S.T. devices 133, 134, arranged as a long-tailed pair. The input terminal of amplifier 7c is the gate of M.O.S.T. device 133. The gate of M.O.S.T. device 134 is connected to the slider of potentiometer 127.

M.O.S.T. devices are known and are now becoming generally available. Their manner of operation has been published and need not be repeated herein.

The operation of amplifier 7c is sufficiently described in stating that change of potential of the gate of M.O.S.T. device 133 varies the current flowing through the device and hence through resistors 122, 124. The common resistor 124 provides coupling with M.O.S.T. device 134 and the two devices 133, 134 function as a long-tailed pair in established manner. Thus, when the potential of the input terminal of amplifier 7c moves in the positive sense, the base of transistor 104 moves in the positive sense by an amplified amount.

Considering now, generally, the amplifier circuit arrangements of all FIGS. 4a, 4b and 4c, transistor 104 is a transistor emitter follower driving transistor 106. Transistor 106 is a phase, that is sign, reversing emitter coupled amplifier driving transistor 113. Transistor 113 is an emitter follower providing the output of the amplifier. Transistor 112 provides a substantially constant-current emitter circuit for transistor 113 and, in fact, carries the load current when the output potential of terminal 4 is negative of 0 v.

Resuming the description of operation, if the input terminal, gate of device 133, moves positively, the base of transistor 104 and the base of transistor 106 move positively an amplified amount. Thus, the base of transistor 113 moves negatively and the output terminal 4 moves negatively, correspondingly. Overall, the amplifiers 7a, 7b and 7c provide high amplification and sign reversal.

Referring back to FIGS. 2 and 3, it will be noted that the output, emitter-follower transistor 113 and constant-current transistor 112 of FIGS. 4a, 4b and 4c correspond exactly, in their circuit and function, to transistors 81 and 85 of FIG. 3 and to transistors 55 and 50 of FIG. 2.

The output of each unit, 5, 6 and 7 respectively, is consequently able to supply an adequate output current.

The emitter-follower transistors 112, 85 and 59, respectively, could be replaced by resistors, but this would result in increased current drain from the voltage supplies +20 v. and −20 v., higher wattage dissipation in transistors 113, 81 and 55, respectively, and some loss of overall gain in the respective circuits.

What I claim is:

1. An electric wave generator comprising a trigger for providing a square wave at the output terminal for feeding an integrator, said integrator having an integrating resistance and an integrating capacitance for providing a triangular wave at the output terminal from said square wave applied to its input terminal, means for setting the amplitude of the square wave of the output terminal of the trigger, a first feedback path from the integrator output terminal to the trigger input terminal, the integrator being fed from the trigger by way of an intermediate amplifier having positive gain, a second feedback path being provided from the integrator output terminal to the intermediate amplifier input terminal, the intermediate amplifier being supplied with a potential intermediate the trigger output potential and the integrator output potential by inclusion of a first resistor in the trigger output to an intermediate amplifier input feed path together with a second resistor in said second feedback path, and a third feedback path being provided from the intermediate amplifier output terminal to the trigger input terminal.

2. An electric wave generator as claimed in claim 1 in that the intermediate amplifier square wave output levels are stabilized by reverse-sensed diodes.

3. An electric wave generator as claimed in claim 1 in that the trigger is a bi-stable multivibrator comprising a transistor direct-current amplifier with positive gain and positive feedback.

4. An electric wave generator comprising a bistaple trigger having input and output terminals, for providing a square waveform output, an integrator, having an integrating resistance and an integrating capacitance for providing an output triangular wave from a square wave input and connected for supplying the output wave to a trigger input terminal, the integrator being fed from the trigger by way of an intermediate amplifier, positive feedback being provided from the output of the said intermediate amplifier to the trigger input terminal and the intermediate amplifier being supplied with a potential intermediate the trigger output and the integrator output potentials.

5. An electric wave generator as claimed in claim 4, in which the said trigger is a transistor D.C. amplifier with positive gain and positive feedback.

6. An electric wave generator as claimed in claim 4, in which the said intermediate amplifier is a transistor D.C. amplifier with positive gain, adapted to have set square wave output levels.

7. An electric wave generator as claimed in claim 4, in which the said integrator is a D.C. amplifier with negative gain, having its integrating resistance connected in series with its input, followed by a transistor D.C. amplifier providing feedback by way of the integrating capacitance.

8. An electric wave generator as claimed in claim 7, in which the integrator amplifier includes an input amplifier having a high input impedance.

References Cited

UNITED STATES PATENTS

| 2,748,272 | 5/1956 | Schrock | 328—127 |
| 3,256,426 | 6/1966 | Roth et al. | 328—127 |
| 3,294,981 | 12/1966 | Bose | 307—88.5 |

ARTHUR GAUSS, *Primary Examiner.*

S. D. MILLER, JR., *Assistant Examiner.*